(12) United States Patent
Clearman

(10) Patent No.: US 9,772,542 B2
(45) Date of Patent: Sep. 26, 2017

(54) CAMERA MOUNT

(71) Applicant: GoPro, Inc., San Mateo, CA (US)

(72) Inventor: Christopher Aaron Clearman, Half Moon Bay, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/180,535

(22) Filed: Jun. 13, 2016

(65) Prior Publication Data

US 2017/0108759 A1    Apr. 20, 2017

Related U.S. Application Data

(63) Continuation of application No. 14/883,431, filed on Oct. 14, 2015, now Pat. No. 9,395,031.

(51) Int. Cl.
*G03B 17/56* (2006.01)
*F16M 11/04* (2006.01)
*F16M 11/14* (2006.01)
*F16M 13/02* (2006.01)

(52) U.S. Cl.
CPC ......... *G03B 17/561* (2013.01); *F16M 11/041* (2013.01); *F16M 11/14* (2013.01); *F16M 13/02* (2013.01)

(58) Field of Classification Search
None
See application file for complete search history.

(56) References Cited

U.S. PATENT DOCUMENTS

| | | | |
|---|---|---|---|
| 7,185,862 B1* | 3/2007 | Yang | F16M 11/041 248/187.1 |
| 8,348,214 B2* | 1/2013 | Vogt | F16M 11/041 248/187.1 |
| 9,243,737 B2 | 1/2016 | Hida | |
| 9,297,640 B2* | 3/2016 | Tassakos | G01B 11/002 |
| 9,372,383 B2* | 6/2016 | Johnson, Sr. | G03B 17/568 |
| 2005/0041966 A1* | 2/2005 | Johnson | F16M 11/041 396/428 |
| 2009/0110380 A1 | 4/2009 | Fantone et al. | |
| 2010/0229450 A1* | 9/2010 | Becker | F41C 23/14 42/90 |
| 2012/0120236 A1* | 5/2012 | Xiao | H04N 5/2251 348/143 |
| 2015/0346588 A1 | 12/2015 | Hudson et al. | |

* cited by examiner

*Primary Examiner* — Clayton E Laballe
*Assistant Examiner* — Linda B Smith
(74) *Attorney, Agent, or Firm* — Fenwick & West LLP

(57) ABSTRACT

A camera mount is configured to securely couple a camera to an object. The camera mount includes a rail mount component and a sliding mount component which can be securely coupled, resulting in a low profile, easy to use camera mount. The rail mount component includes a rail base and two rail wings. The sliding mount component is configured to be inserted into the rail mount component. The sliding amount component further includes two levers and a sliding base with a plurality of protrusions for coupling to a reciprocal mount component. Each lever of the sliding mount component includes a pin and wedge that abut the inside of the rail base to secure the sliding mount component to the rail mount component.

18 Claims, 12 Drawing Sheets

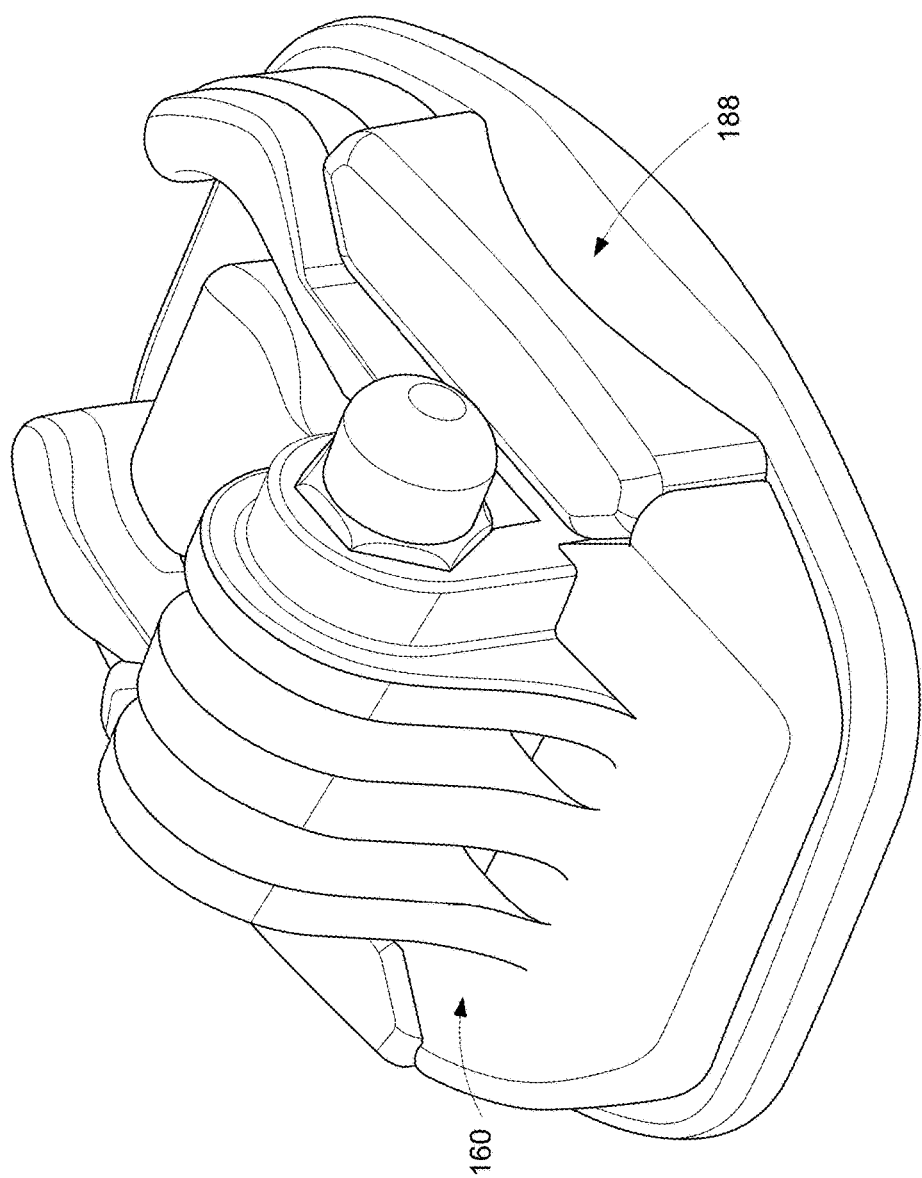

CAMERA MOUNT

CROSS REFERENCE TO RELATED APPLICATIONS

This application is a continuation of U.S. application Ser. No. 14/883,431, filed Oct. 14, 2015, now U.S. Pat. No. 9,395,031, which is incorporated by reference in its entirety.

BACKGROUND

Technical Field

This disclosure relates camera mounts, and more specifically, to camera mount for use in coupling a camera to an object.

Description of the Related Art

Digital cameras are increasingly used in outdoors and sports environments. Cameras can be secured to sports equipment, vehicles, a user, and other objects using various camera mounts. Camera mounts can be bulky and obtrusive, and can be difficult to move/maneuver, diminishing a user's experience with and ability to use a camera coupled to the mount. A low-profile mount that enables one component of the mount to easily move relative to another component can beneficially increase the flexibility of a user to use the mount and configure the capture angle of the camera without the need for a bulky/obtrusive mount.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

FIG. 1d illustrates a lower mount component coupled to a base mount component, according to one embodiment.

DETAILED DESCRIPTION

Figure 1A:
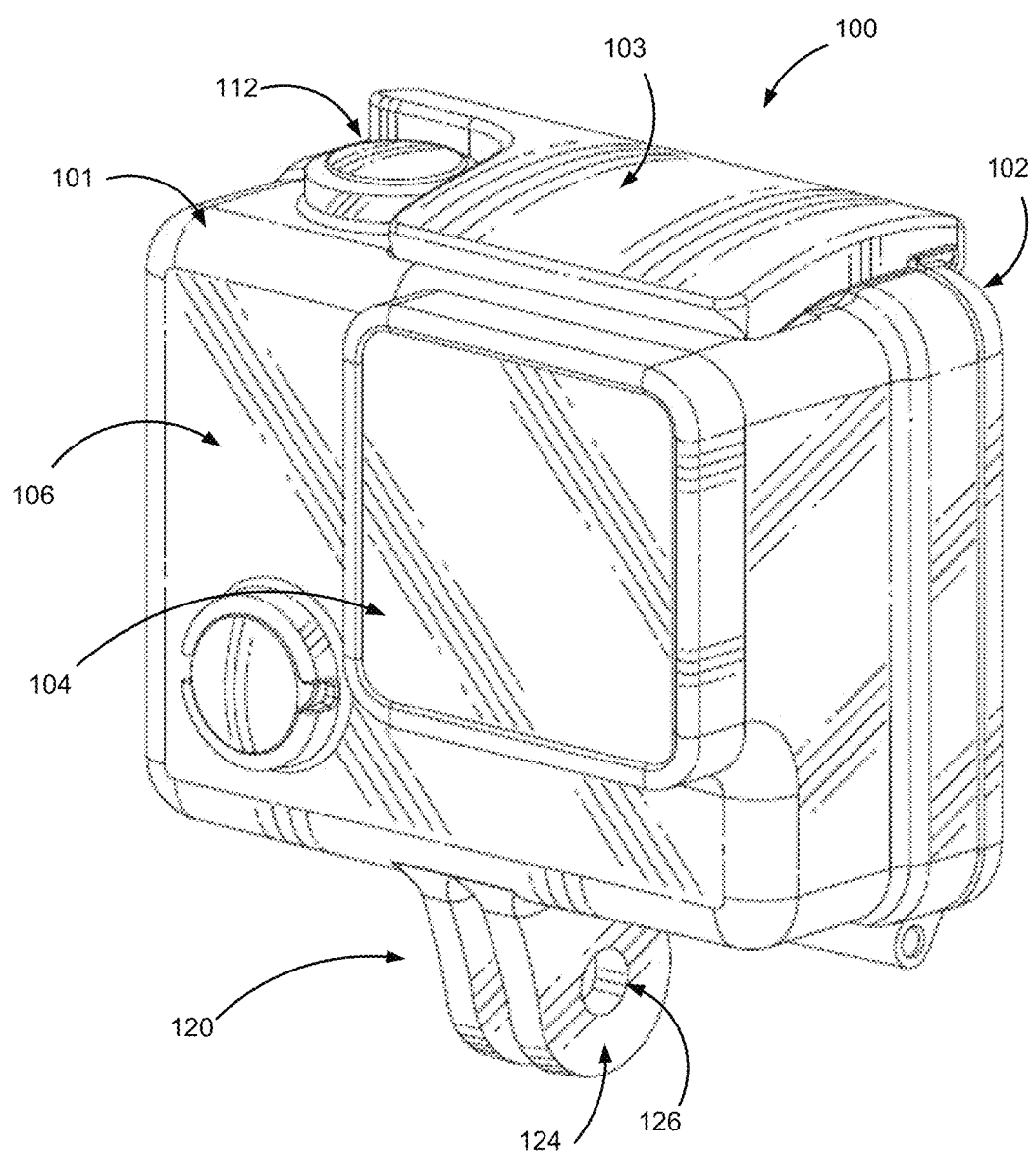
FIG. 1a illustrates a perspective view of a camera system, according to one embodiment.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview Configuration

A camera mount is configured to securely couple a camera to an object. The camera mount includes a rail mount component and a sliding mount component which can be securely coupled, resulting in a low profile, easy to use camera mount. In one embodiment, the rail mount component is screwed or otherwise coupled flush to the bottom of a camera or a camera housing component. The rail mount component includes a rail base and two symmetrical rail wings protruding outward from and towards the rail base. The rail base can further include two tolerance cuts, a stopper, and two locking holes. The sliding mount component is configured to be inserted into the rail mount component. The sliding amount component includes a sliding base with a plurality of protrusions for coupling to a reciprocal mount component and two levers pivotally coupled to the sliding base on opposite sides of the sliding base. Each lever includes a pin and wedge that interface with the inside of the rail base to secure the sliding mount component to the rail mount component. Each wedge exerts a force towards the rail base when an associated lever is pivoted into a locking configuration, causing a reciprocal force to act on the sliding mount component such that the sliding mount component abuts an inside surface of each rail wing. The resulting friction between the sliding mount component and the inside surface of each rail wing secures the sliding mount component within the rail mount component. Each pin is inserted into a reciprocal locking hole in the rail base, which further secures the sliding mount component within the rail mount component. The stopper forcibly prevents the sliding mount component from moving past the stopper within the rail mount component.

Example Camera System Configuration

A camera system includes a camera and a camera housing structured to at least partially enclose the camera. The camera comprises a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera housing includes a lens window structured on the front surface of the camera housing and configured to substantially align with the camera lens, and one or more indicator windows structured on the front surface of the camera housing and configured to substantially align with the camera indicators.

FIG. 1a illustrates a perspective view of a camera system, according to one embodiment. The camera system includes, among other components, a camera housing 100. In one embodiment, a first housing portion 101 includes a front face with four sides (i.e., a top side, bottom side, left side, and right side) structured to form a cavity that receives a camera (e.g. a still camera or video camera) and to couple to a second housing portion 102 via a coupling mechanism 103. In other embodiments, the camera housing 100 may not include one or more sides or faces. For instance, the camera housing 100 may not include a front or back face, allowing the front face and rear face of the camera to be exposed when partially enclosed by the top side, bottom side, left side, and right side of the camera housing 100.

In one embodiment, the camera housing 100 has a small form factor (e.g., a height of approximately 4 to 6 centimeters, a width of approximately 5 to 7 centimeters, and a depth of approximately 1 to 4 centimeters), and is lightweight (e.g., approximately 50 to 150 grams). The camera housing 100 can be rigid (or substantially rigid) (e.g., plastic, metal, fiberglass, etc.) or pliable (or substantially pliable) (e.g., leather, vinyl, neoprene, etc.). In one embodiment, the camera housing 100 may be appropriately configured for use in various elements. For example, the camera housing 100 may comprise a waterproof enclosure that protects a camera from water when used, for example, while surfing or scuba diving.

Portions of the camera housing 100 may include exposed areas to allow a user to manipulate buttons on the camera that are associated with the camera functionality. Alternatively, such areas may be covered with a pliable material to allow the user to manipulate the buttons through the camera housing 100. For example, in one embodiment the top face of the camera housing 100 includes an outer shutter button 112 structured so that a shutter button 112 of the camera is substantially aligned with the outer shutter button 112 when the camera is secured within the camera housing 100. The shutter button 112 of the camera is operationally coupled to the outer shutter button 112 so that pressing the outer shutter button 112 allows the user to operate the camera shutter button.

In one embodiment, the front face of the camera housing 100 includes a lens window 104 structured so that a lens of the camera is substantially aligned with the lens windows 104 when the camera is secured within the camera housing 100. The lens window 104 can be adapted for use with a conventional lens, a wide angle lens, a flat lens, or any other specialized camera lens. In this embodiment, the lens window 104 comprises a waterproof seal so as to maintain the waterproof aspect of the housing 100.

In one embodiment, the camera housing 100 includes one or more securing structures 120 for securing the camera housing 100 to one of a variety of mounting devices. For example, FIG. 1a illustrates the camera housing with a first plurality of protrusions 124 configured to interlock with a second plurality of protrusions of a lower mount component (as described in conjunction with FIG. 1c) such that the first and second pluralities of protrusions can interlock in such a way that the protrusion holes substantially align. Continuing with this example, a turnable handscrew can be inserted through the aligned holes, coupling the camera housing 100 to the lower mount component such that the camera housing can pivotally rotate relative to the lower mount component when the turnable handscrew is in a first unlocked position, and such that the camera housing is fixed in position relative to the lower mount component when the turnable handscrew is in a second locked position. In other embodiments, the camera housing 100 can be secured to a different type of mounting structure, and can be secured to a mounting structure via a different type of coupling mechanism.

In one embodiment, the camera housing 100 includes an indicator window 106 structured so that one or more camera indicators are substantially aligned with the indicator window 106 when the camera is secured within the camera housing 100. The indicator window 106 can be any shape or size, and can be made of the same material as the remainder of the camera housing 100, or can be made of any other material, for instance a transparent or translucent material and/or a non-reflective material.

The described housing 100 may also be adapted for a wider range of devices of varying shapes, sizes and dimensions besides cameras. For example, an expansion module may be attached to housing 100 to add expanded features to electronic devices such as cell phones, music players, personal digital assistants ("PDAs"), global positioning system ("GPS") units, or other portable electronic devices.

Figure 1B:
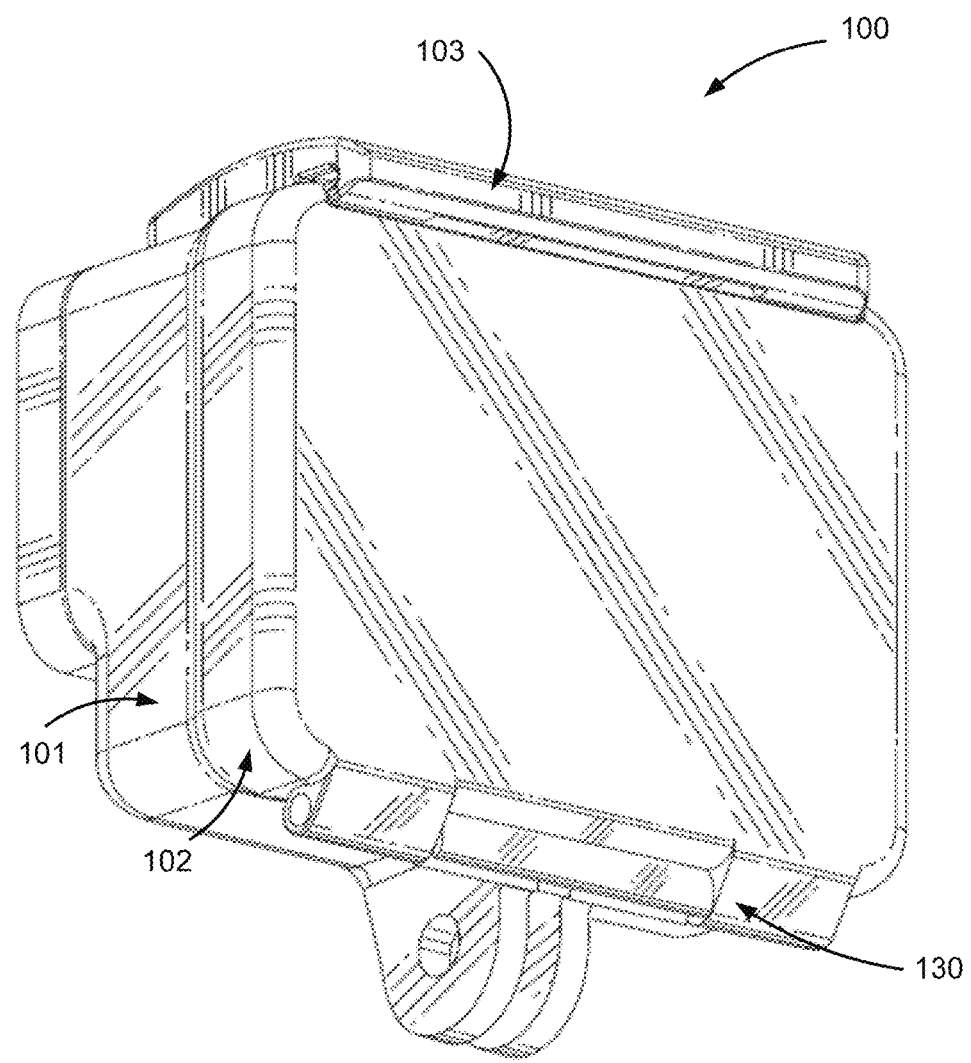
FIG. 1b illustrates a perspective view of a rear of the camera system, according to one embodiment.

FIG. 1b illustrates a perspective view of a rear of the camera system, according to one embodiment. The second housing portion 102 detachably couples with the first housing portion 101 opposite the front face of the first housing portion. The first housing portion 101 and second housing portion 102 are collectively structured to enclose a camera within the cavity when the second housing portion 102 is secured to the first housing portion 101 in a closed position.

In one embodiment, the second housing portion 102 comprises a door that allows the camera to be removed from the housing 100. The door pivots around a hinge 130 that allows the door 130 to be opened or shut. In one embodiment, a coupling mechanism 103 located on the top face of the camera housing 100 detachably couples to a ridge on the second housing portion 102. The coupling mechanism 103 can be pressed downwards to secure the coupling mechanism 103 into place, thereby securing the second housing portion 102 against the first housing portion 101. Likewise, the coupling mechanism 103 can be lifted upwards to release the second housing portion 102 from the first housing portion 101, thereby allowing for the removal of a camera from the camera housing 100 or the insertion of a camera into the camera housing. In different embodiments, the coupling mechanism 103 can include, for example, a button assembly, a buckle assembly, a clip assembly, a hook and loop assembly, a magnet assembly, a ball and catch assembly, a latch assembly, and an adhesive assembly, or any other type of securing mechanism. In one embodiment, the housing 100 includes a watertight seal so that the housing 100 is waterproof when the second housing portion 102 is securely compressed against the first housing portion 101.

Figure 1C:
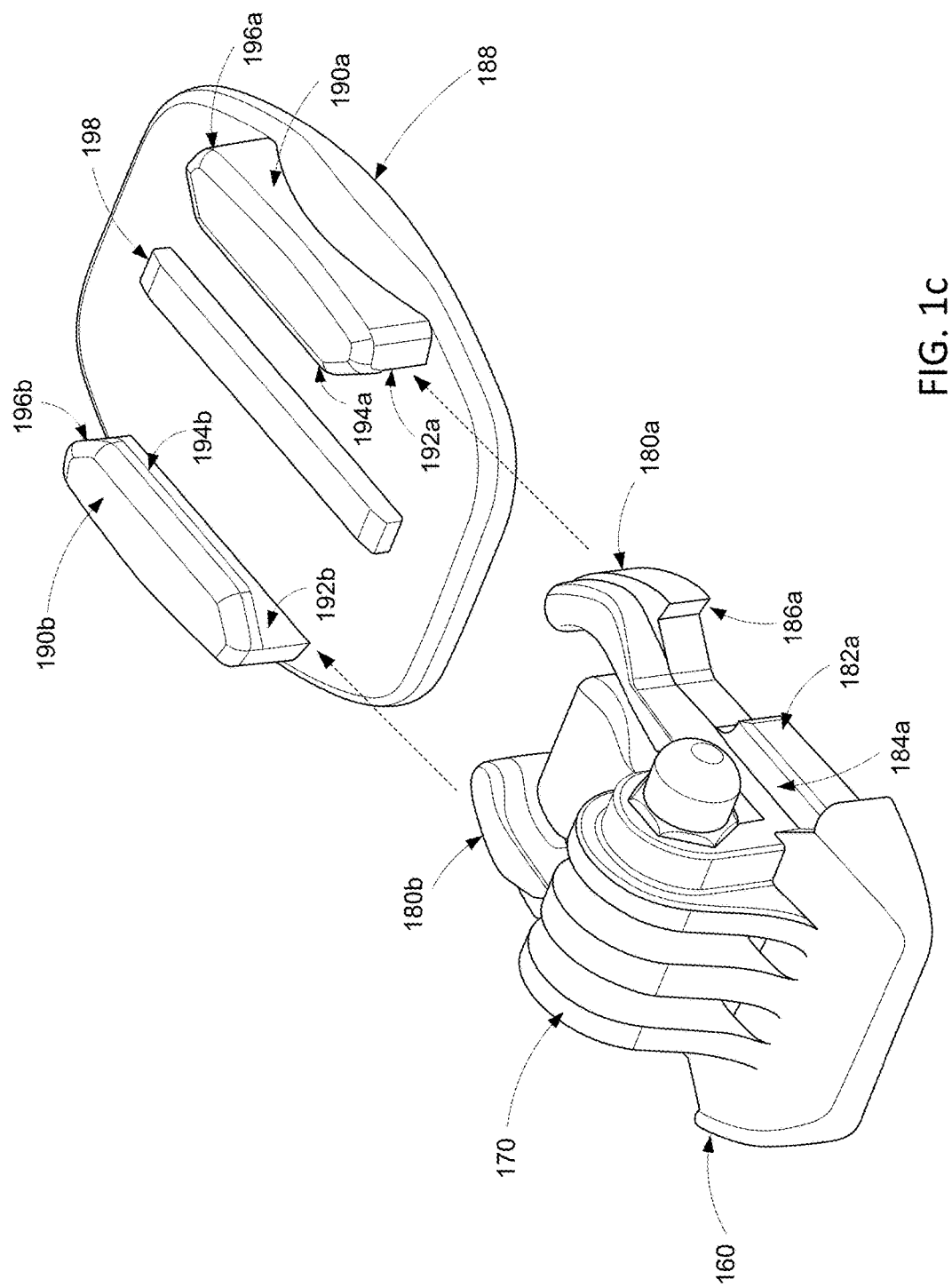
FIG. 1c illustrates a lower mount component uncoupled to a base mount component, according to one embodiment.

FIG. 1c illustrates a lower mount component uncoupled from a base mount component, according to one embodiment. The lower mount component 160 includes a plurality of protrusions 170. In some embodiments, the plurality of protrusions 170 are configured to interlock with the plurality of protrusions 124 of the camera housing 100 of FIG. 1a such that the holes in each protrusion in the sets of protrusions align. When a screw or pin is inserted into the aligned holes, the camera housing 100 can be rotatably secured to the lower mount component 160.

The lower mount component 160 also includes two prongs 180a and 180b that can be flexibly compressed inward when squeezed. The prongs 180a and 180b include side securing surfaces 182a and 182b (not shown), top securing surfaces 184a and 184b, and securing lips 186a and 186b (not shown), respectively. The base mount component 188 includes securing arms 190a and 190b, each with side securing surfaces 192a and 192b, top securing surfaces 194a and 194b, and back securing surfaces 196a and 196b, respectively. The base mount component additionally includes spine 198.

When the prongs 180a and 180b of the lower mount component 160 are squeezed together, the width of the prong-side of the lower mount component is reduced to less than the width between the securing arms 190a and 190b, such that the lower mount component can be slid onto the base mount component 188. When the lower mount component is slid onto the base mount component 188, the side securing surfaces 182a and 182b make contact with and slide along the side securing surfaces 192a and 192b, respectively. Similarly, the top securing surfaces 184a and 184b make contact with and slide along the top securing surfaces 194a and 194b, respectively. When the lower mount component is completely slid into the base mount component 188, the securing arms decompress outward when the securing lips 186a and 186b are slid past the back securing surfaces 196a and 196b. The securing arms flexibly exert force outward such that the securing lips extend outwards and make contact with the back securing surfaces or overlap at least partially with the back securing surfaces, preventing the lower mount component from sliding backwards and securely coupling the lower mount component to the base mount component as illustrated in FIG. 1d. The lower mount component can be uncoupled from the base mount component by compressing the securing arms of the lower mount component such that the width of the prong-side of the lower mount component is again reduced to less than the width between the securing arms of the base mount component, and sliding the lower mount component backwards past the base mount component.

The lower mount component 160 can include a spine groove on the bottom side of the lower mount component to allow for the reciprocal sliding and insertion of the spine 198 of the base mount component 188 into the spine groove when the lower mount component is slid onto and secured to the base mount component. The spine of the base mount component exerts a force upwards on the lower mount component, forcing the lower mount component upward such that the top securing surfaces 184a and 184b are forced upward into the top securing surfaces 194a and 194b.

The upward force of the lower mount component 160 into the top securing surfaces 194a and 194b of the securing arms 190a and 190b result in the vertical securement of the lower mount component onto the base mount component. In other words, by forcing the lower mount component upwards, the spine 198 prevents any up or down motion by the lower mount component relative to the base mount component. In addition, the upwards force exerted by the spine 198 into the lower mount component (the force exerted by the top securing surfaces 182a and 182b into the top securing surfaces 192a and 192b, respectively), in combination with the coefficient of friction between both the top securing surfaces 182a and 192a and the top securing surfaces 182b and 192b, results in a friction force between the lower mount component and the base mount component. The friction force prevents any horizontal movement of the lower mount component relative to the base mount component resulting from horizontal forces on the lower mount component less than the friction force. Thus, the spine 198 secures the lower mount component onto the base mount component by preventing both the vertical and the horizontal movement of the lower mount component relative to the base mount component.

It should be noted in alternative embodiments, the lower mount component 160 is configured to securely couple to the base mount component 188 using other means than those described with regards to FIGS. 1c and 1d. For example, the lower mount component can include a securing protrusion on the bottom side of the lower mount component configured for insertion into a reciprocal opening within the base mount component, and secured using, for example, a securing pin or other locking mechanism. Similarly, the securing arms 190a and 190b of the base mount component can be compressible or flexible such that the arms can be squeezed apart, the lower mount component can be slid onto the base mount component, and the arms can be released, securely coupling the lower mount component to the base mount component. The lower mount component can be securely coupled to the base mount component using adhesives, buttons, ties, latches, springs, or any combination of the mechanisms described herein. Any other suitable securing mechanism can be used to secure the lower mount component to the base mount component. In addition, as will be described below in greater detail, the lower mount component, the base mount component, or both can be configured to detach such that a camera housing can decouple to the lower mount component or such that the lower mount component can decouple from a base mount component in response to a force exerted on the camera housing, the lower mount component, the base mount component, or any combination thereof.

Figure 2A:
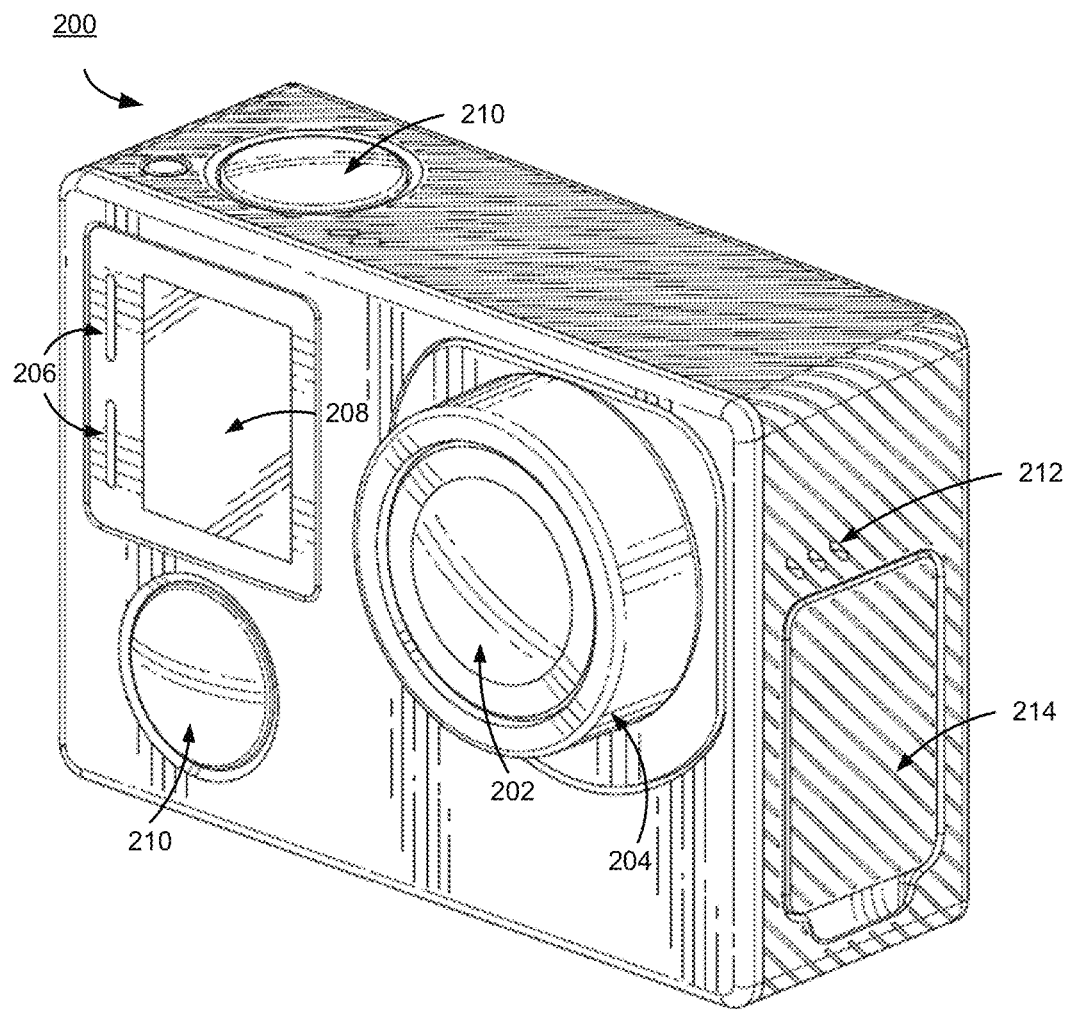
FIG. 2a illustrates a perspective view of a camera for use with the camera system, according to one embodiment.

FIG. 2a illustrates a camera 200 for use with the camera systems described herein, according to one example embodiment. The camera 200 is configured to capture images and video, and to store captured images and video for subsequent display or playback. The camera 200 is adapted to fit within a camera housing, such as the housing 100 discussed above or any other housing described herein. As illustrated, the camera 200 includes a lens 202 configured to receive light incident upon the lens and to direct received light onto an image sensor internal to the lens. The lens 202 is enclosed by a lens ring 204.

The camera 200 can include various indicators, including the LED lights 206 and the LED display 208 shown in FIG. 2a. When the camera 200 is enclosed within the housing 100, the LED display 208 is configured to substantially align with the indicator window 106, and the LED lights 206 are configured to be visible through the housing 100. The camera 200 can also include buttons 210 configured to allow a user of the camera to interact with the camera, to turn the camera on, and to otherwise configure the operating mode of the camera. The camera 200 can also include one or more microphones 212 configured to receive and record audio signals in conjunction with recording video. The side of the camera 200 includes an I/O interface 214. Though the embodiment of FIG. 2a illustrates the I/O interface 214 enclosed by a protective door, the I/O interface can include any type or number of I/O ports or mechanisms, such as USC ports, HDMI ports, memory card slots, and the like.

Figure 2B:
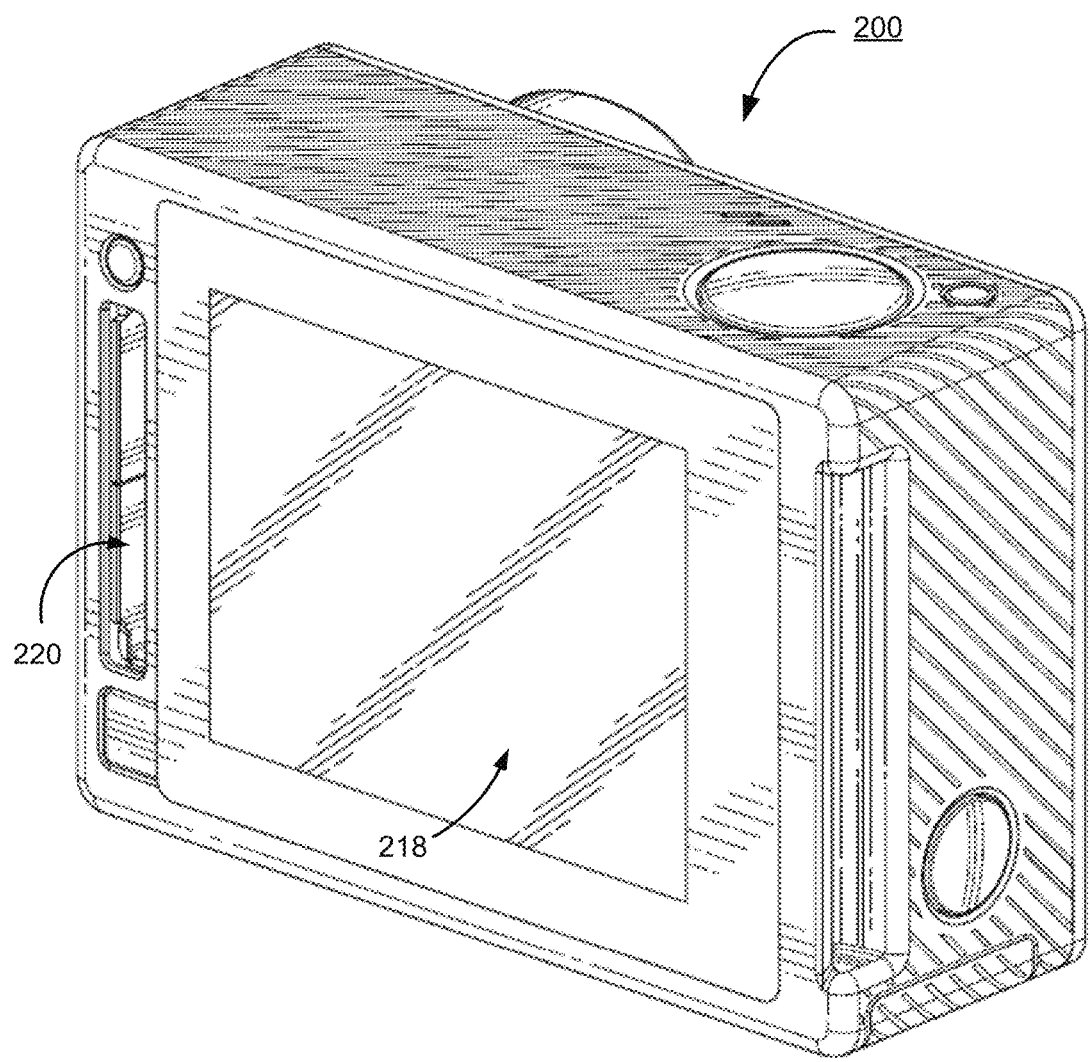
FIG. 2b illustrates a perspective view of a rear of a camera for use with the camera system, according to one embodiment.

FIG. 2b illustrates a perspective view of a rear of a camera 200 for use with the camera system, according to one embodiment. The camera 200 includes a display 218 configured to display camera information or image information (such as captured images or viewfinder images). The camera also includes an expansion pack interface 220 configured to receive a removable expansion pack, such as a display module, an extra battery module, a wireless module, and the like. Removable expansion packs, when coupled to the camera 200, provide additional functionality to the camera via the expansion pack interface 220.

Camera Mount Embodiments

Figure 3A:
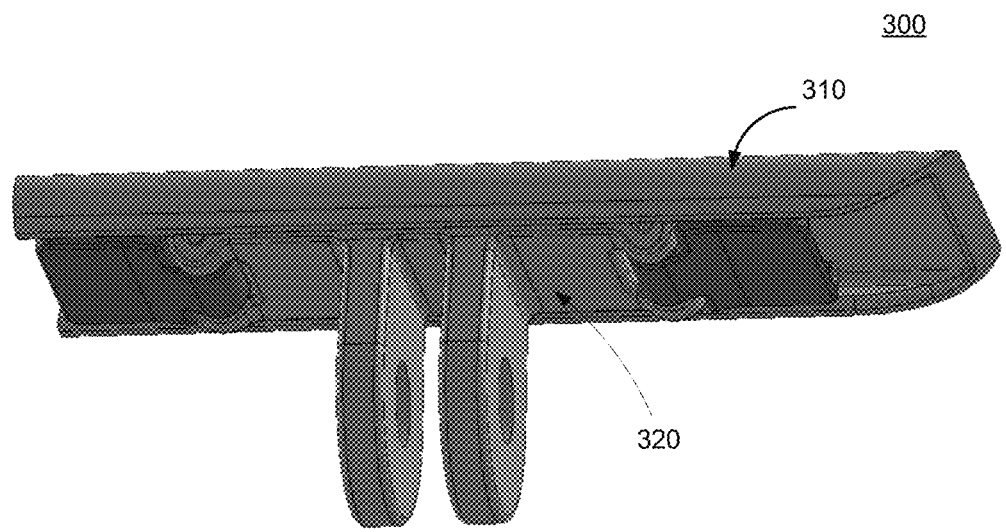
FIG. 3a illustrates a bottom perspective view of a camera mount, according to one embodiment.

FIG. 3a illustrates a bottom perspective view of a camera mount, according to one embodiment. The camera mount 300 includes a rail mount component 310 and a sliding mount component 320. In the embodiment of FIG. 3a, the sliding mount component 320 is inserted within the rail mount component 310 in a locked configuration such that the sliding mount component is securely coupled to the rail mount component. In other embodiments, the sliding mount component 320 can be configured in an unlocked configuration, allowing the sliding mount component 320 to be inserted into or removed from the rail mount component 310.

Figure 3B:
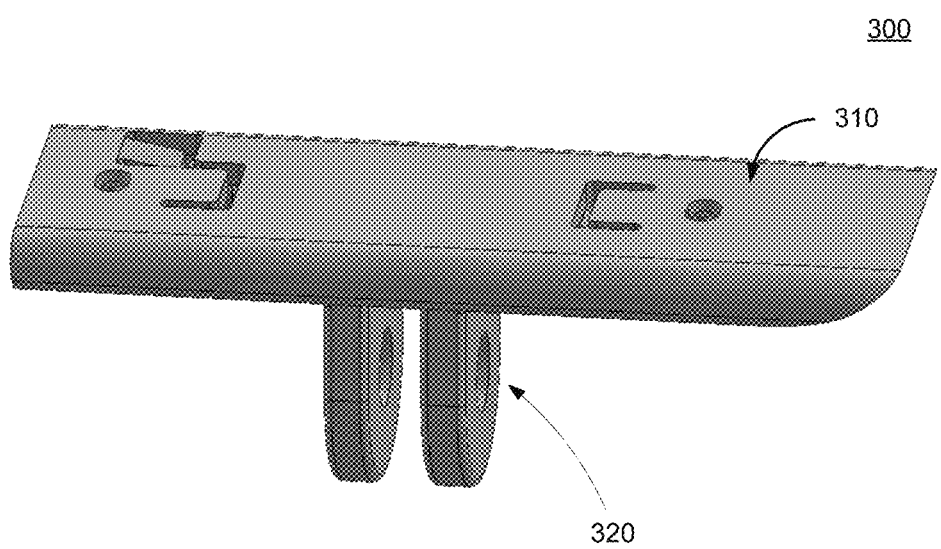
FIG. 3b illustrates a top perspective view of a camera mount, according to one embodiment.

FIG. 3b illustrates a top perspective view of a camera mount, according to one embodiment. In the embodiment of FIG. 3b, a top surface of the rail mount component 310 is shown. In some embodiments, the camera mount 300 is securely coupled to a camera or camera housing via the top surface of the rail mount component 310, for instance using screws, an adhesive, a latch or buckle mechanism, and the like. The camera mount 300 can also be coupled to a reciprocal mount component via the sliding mount component 320, which in turn can be coupled to an object, a vehicle, sports equipment, or a user, thereby coupling the camera to the object, vehicle, sports equipment or user.

Figure 4A:
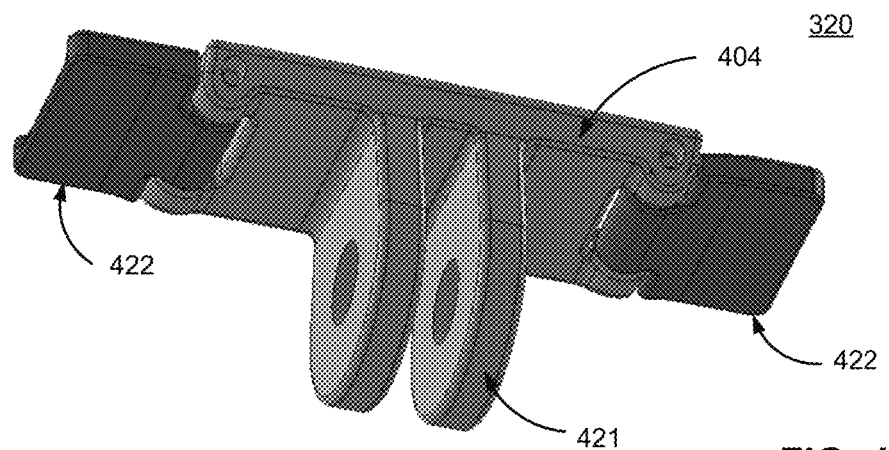
FIG. 4a illustrates a bottom view of a sliding mount component, according to one embodiment.

FIG. 4a illustrates a bottom view of a sliding mount component, according to one embodiment. The sliding mount component 320 includes a sliding base with a tapered sliding edge 404 on each side of the sliding base and a plurality of protrusions 421 protruding outward from the bottom surface of the sliding base. The plurality of protrusions are configured to couple to a reciprocal mount component. In some embodiments, the plurality of protrusions, for example, can interlock with the plurality of protrusions of a reciprocal mount component as described above such that the holes in each protrusion in the sets of protrusions align. When a screw or pin is inserted into the aligned holes, the camera mount 300 can be rotatably secured to the reciprocal mount component.

The sliding mount component 320 also includes two levers 422 pivotally coupled to the sliding base on opposite sides of the sliding base. Each lever 422 pivots around a corresponding hinge located at an end of the sliding base. In one embodiment, each lever 422 is configured to rotate around the corresponding hinge towards the protrusions 421, configuring the camera mount 300 in an unlocked configuration and allowing the sliding mount component 320 to be inserted into or removed from the rail mount component 310. In another embodiment, each lever 422 is configured to rotate around the hinge away from the protrusions 421 and substantially co-planar with the sliding base when the sliding mount component 320 is inserted into the rail mount component 310, configuring the camera mount 300 in a locked configuration and securely coupling the sliding mount component to the rail mount component.

Figure 4B:
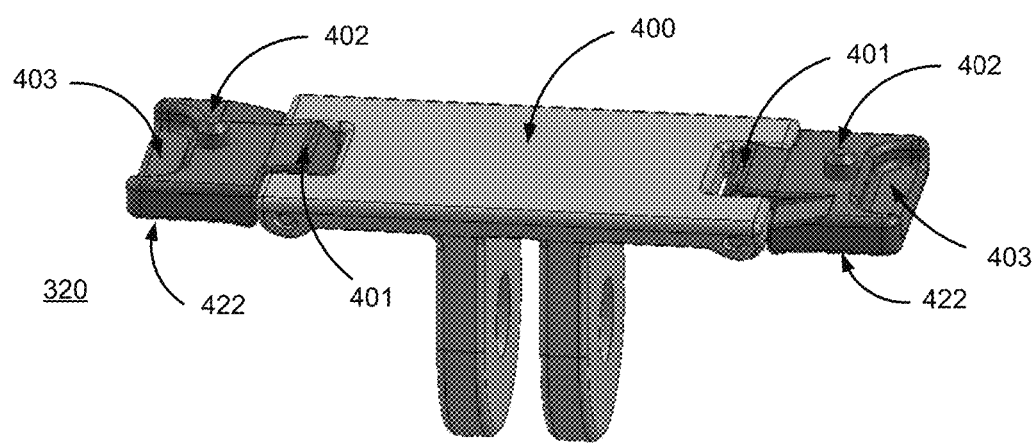
FIG. 4b illustrates a top view of a sliding mount component, according to one embodiment.

FIG. 4b illustrates a top view of a sliding mount component, according to one embodiment. In the embodiment of FIG. 4b, a top surface 400 of the sliding mount component 320 is shown. Each lever 422 includes a corresponding pin 402, a corresponding wedge 401, and a corresponding divot 403 on the top surface of the lever. The pin 402 and wedge 401 are configured to forcibly abut the inside surface of the rail mount component 310 to secure the sliding mount component 320 to the rail mount component when each lever 422 is rotated away from the protrusions 421 and substantially co-planar with the sliding base (when the camera mount 300 is configured in the locked configuration). It should be noted that when each lever 422 is rotated away from the protrusions 421 and is substantially co-planar with the sliding base, each wedge 401 protrudes outward from the top surface 400 of the sliding mount component 320. Further, when each lever 422 is rotated towards the protrusions 421, each wedge 401 protrudes outward from the corresponding lever, but not from the top surface 400, beneficially enabling a user to easily insert and remove the sliding mount component 320 into and from the rail mount component 310. Each divot 403 located at an end of the corresponding lever 422 is configured to make it easy for users to rotate the lever towards the protrusions 421 (or "flip up" the lever) to allow for the removal of the sliding mount component 320 from the rail mount component 310 when the sliding mount is inserted within the rail mount component when the camera mount 300 is in the locked configuration.

Figure 4C:
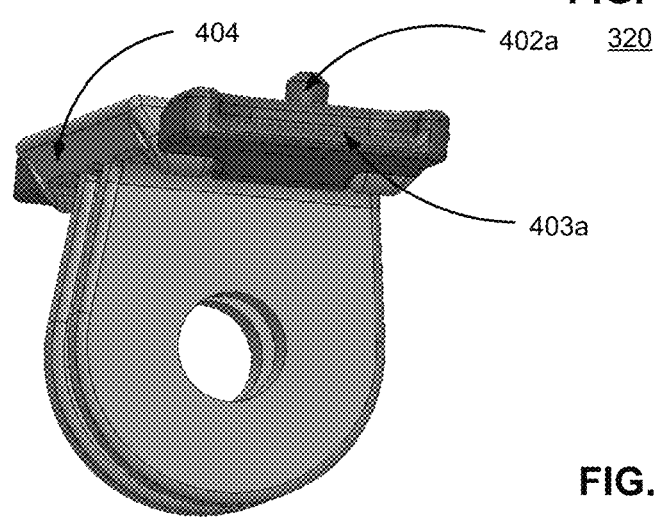
FIG. 4c illustrates a side view of a sliding mount component, according to one embodiment.

FIG. 4c illustrates a side view of a sliding mount component, according to one embodiment. A tapered sliding edge 404, a pin 402, and a divot 403 of the sliding mount component 320 are shown in the embodiment of FIG. 4c. The tapered sliding edge 404 is tapered at an angle configured to allow the sliding mount component 320 to be freely inserted into or removed from the rail mount component 310. In some embodiments, each tapered sliding edge 404 is angled at the same angle as a corresponding reciprocal rail wing 502 of the rail mount component 310 (as described below) such that friction is generated between each sliding edge and the inside surface of the corresponding reciprocal rail wing when the camera mount 300 is configured in the locked configuration, thus securing the sliding mount component 320 to the rail mount component.

Figure 5A:
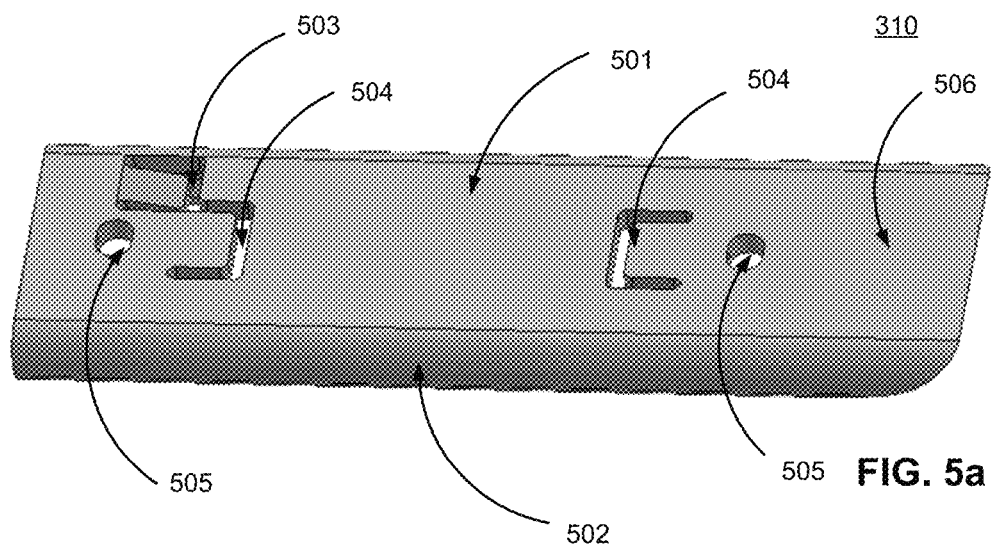
FIG. 5a illustrates a top view of a rail mount component, according to one embodiment.

FIG. 5a illustrates a top view of a rail mount component, according to one embodiment. As illustrated in the embodiment of FIG. 5a, the rail mount component 310 includes a rail base 501. The rail mount component 310 also includes two symmetrical rail wings 502 (though only one rail wing is visible in FIG. 5a). In one embodiment, one of the two opposite ends of the rail base 501 is configured to be a dovetail end 506 with tapered rail wings 502, beneficially allowing for easy insertion and removal of the sliding mount component 320 into and from the rail mount component 310.

The rail base 501 further includes two tolerance cuts 504 and two locking holes in opposite sides of the rail base. The tolerance cuts 504 are configured to accommodate manufacturing tolerances within the sliding mount component 320 and the rail mount component 310. The locking holes 505 are configured to allow the sliding mount component 320 to securely couple within the rail mount component 310, as described below. The rail base also includes a stopper component 503 in an end of the rail base opposite to the dovetail end 506. The stopper component 503 is a portion of the rail base 501 protruding inward from the rail base such that the stopper component securely abuts the sliding mount component 320 when the sliding mount component is fully inserted into the rail mount component 310.

Figure 5B:
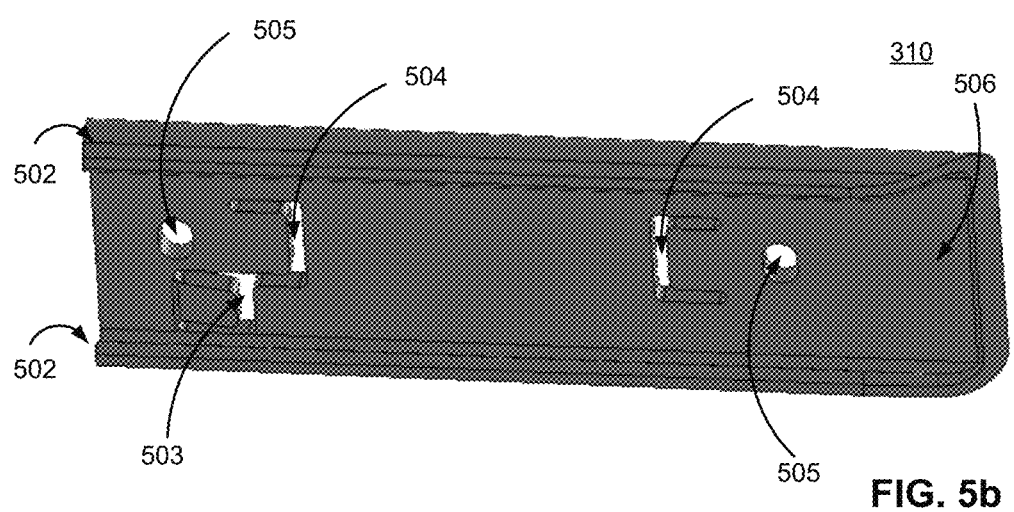
FIG. 5b illustrates a bottom view of a rail mount component, according to one embodiment.

FIG. 5b illustrates a bottom view of a rail mount component, according to one embodiment. The tolerance cuts 504 are configured to flex outward and away from the inside surface of the rail base 501 when the camera mount 300 is in the locked configuration to accommodate the wedges 401 which protrude outward from the top surface of the levers 422 and towards the inside surface of the rail base when the levers of the sliding mount component 320 are rotated away from the protrusions 421 (or "flipped down"), coupling the sliding mount component to the rail mount component 310.

Figure 5C:
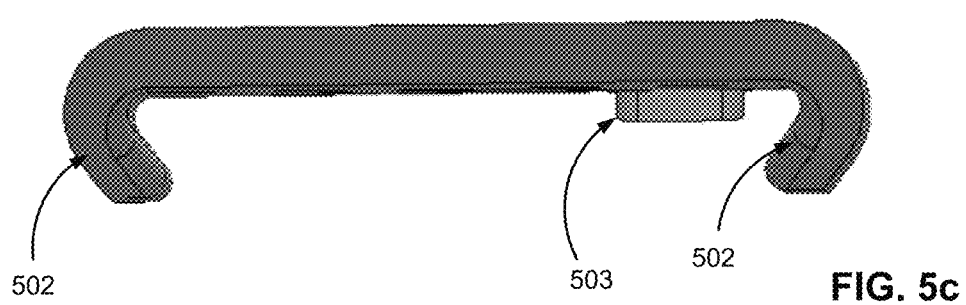
FIG. 5c illustrates a side view of a rail mount component, according to one embodiment.

FIG. 5c illustrates a side view of a rail mount component from the perspective of the dovetail end 506, according to one embodiment. In the embodiment of FIG. 5c, the rail wings 502 and the protruding stopper component 503 are illustrated. Each of the rail wings 502 is configured to protrude outward from and towards the rail base 501 at a tapered angle. When the camera mount 300 is configured in the locked configuration, the sliding mount component 320 is inserted within the rail mount component 310, and each wedge 401 exerts a force towards the inside surface of the rail base 501 when the corresponding lever 422 is rotated to be substantially co-planar with the sliding base of the sliding mount component 320, causing a reciprocal force to act on the sliding mount component such that each tapered sliding edge 404 abuts an inside surface of a corresponding rail wing 502. The resulting friction between the tapered sliding edge 404 and the inside surface of the corresponding rail wing 502 forcibly secures the sliding mount component 320 within the rail mount component 310. As noted above, the angle of each tapered sliding edge 404 is the same or similar to the angle of the inside surface of the corresponding rail wing 502.

Figure 6A:
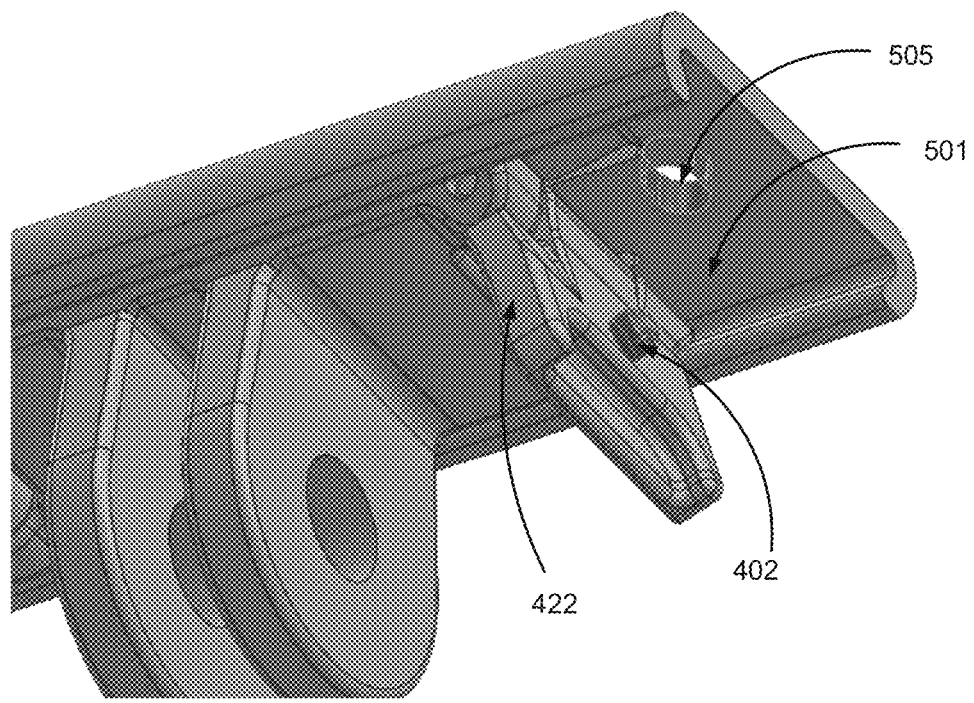
FIG. 6a illustrates a perspective view of a rail mount component locking mechanism, according to one embodiment.

FIG. 6a illustrates a perspective view of a rail mount component locking mechanism, according to one embodiment. In the embodiment of FIG. 6a, the lever 422 of the sliding mount component 320 is flipped up, illustrating the pin 402 and the reciprocal locking hole 505 located in the rail base. The pin 402 aligns with the locking hole 505 such that when the lever 422 is rotated towards the rail base 501, the pin 402 is inserted into the locking hole 505, thus further securing the sliding mount component 320 within the rail mount component 310.

Figure 6B:
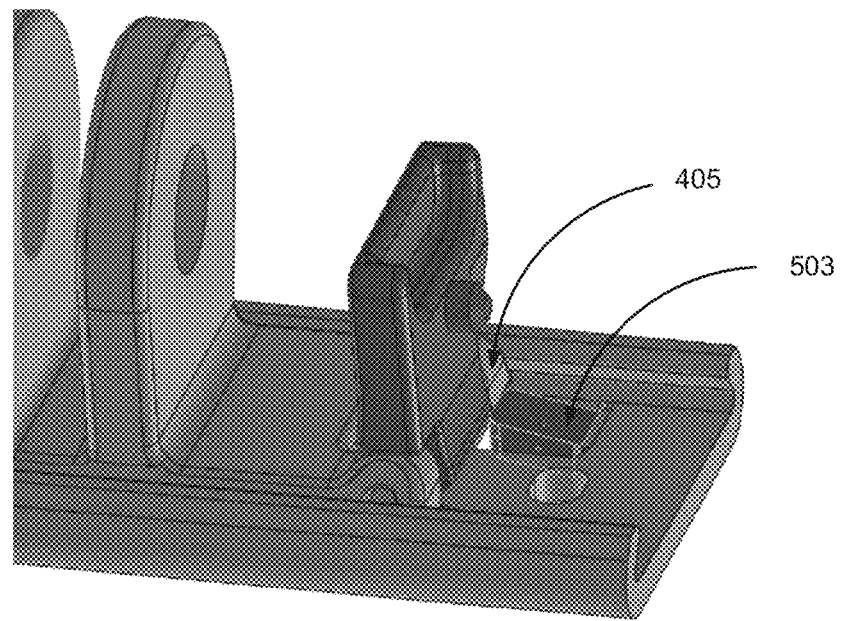
FIG. 6b illustrates a perspective view of a sliding mount component with a stopper component, according to one embodiment.

FIG. 6b illustrates a perspective view of a sliding mount component stopper component, according to one embodiment. In the embodiment of FIG. 6b, the sliding mount component 320 is inserted within the rail mount component 310 from the dovetail end 506 of the rail mount component. In one embodiment, the bottom end 405 of the sliding base abuts the protruding stopper component 503 such that the stopper component forcibly prevents the sliding mount component 320 from moving past the stopper within the rail mount component 310. The stopper component 503 is also configured to allow users, when the sliding mount component 320 is fully inserted into the rail mount component 310 (such that the bottom end 405 of the sliding base abuts the stopper component 503), to quickly and easily align the pins 402 with the reciprocal locking holes 505.

Figure 7A:
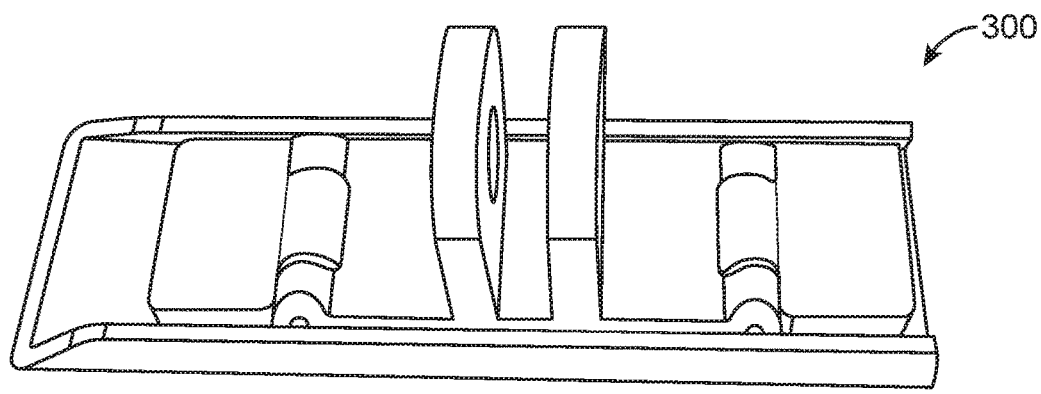
FIG. 7a illustrates a perspective view of the camera mount in a locked configuration, according to one embodiment.

FIG. 7a illustrates a perspective view of the camera mount in a locked configuration, according to one embodiment. In the embodiment of FIG. 7a, the levers are flipped down, configuring the camera mount 300 into a locked configuration, securely coupling the sliding mount component to the rail mount component.

Figure 7B:
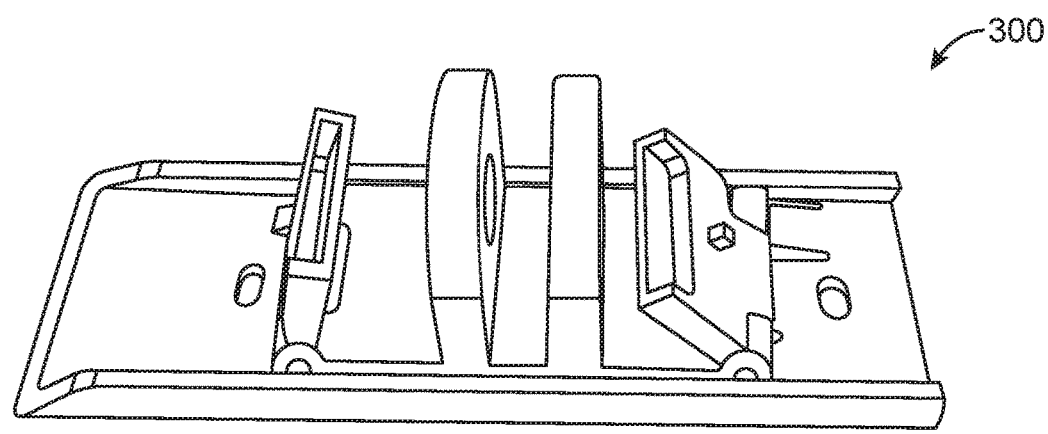
FIG. 7b illustrates a perspective view of the camera mount in an unlocked configuration, according to one embodiment.

FIG. 7b illustrates a perspective view of in the camera mount in an unlocked configuration, according to one embodiment. In the embodiment of FIG. 7b, the sliding mount component is slid within the rail mount component with the levers flipped up, the bottom end abutting the stopper component in the rail base.

Figure 8A:
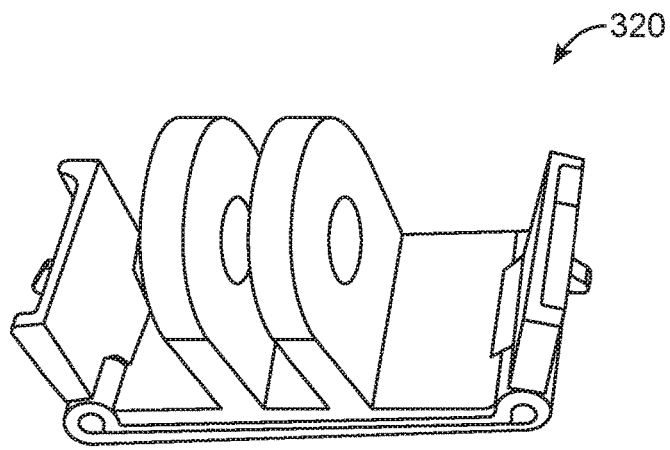
FIG. 8a illustrates a top view of a sliding mount component with levers flipped up, according to one embodiment.
Figure 8B:
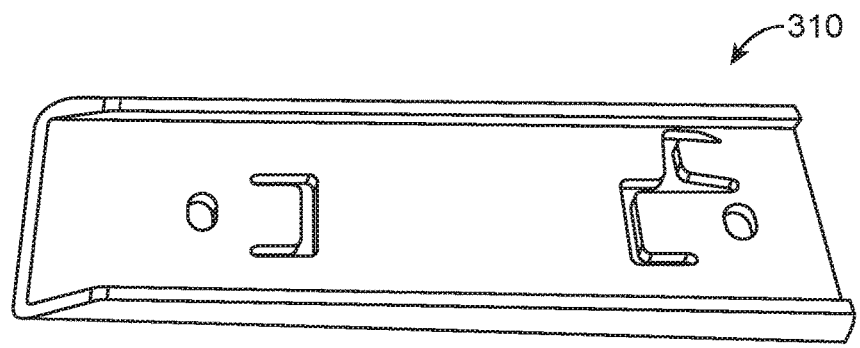
FIG. 8b illustrates a bottom view of a rail mount component, according to one embodiment.
Figure 8C:
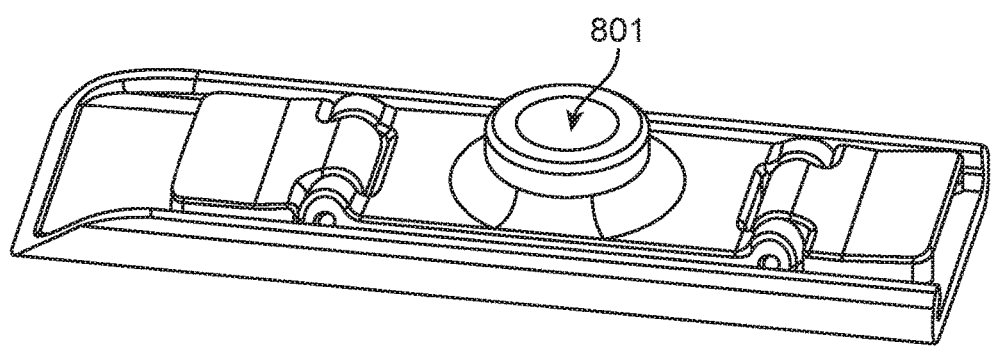
FIG. 8c illustrates a perspective view of a rail mount with a ball and socket component, according to one embodiment.

FIG. 8a illustrates a top view of a sliding mount component 320 with levers flipped up, according to one embodiment. FIG. 8b illustrates a bottom view of a rail mount component 310, according to one embodiment. FIG. 8c illustrates a perspective view of a camera mount with a ball and socket component, according to one embodiment. In the embodiment of FIG. 8c, the sliding mount component is slid within the rail mount component in a locked configuration. The sliding mount component includes a socket component 801 on the bottom surface of the sliding mount component, configured to couple to a reciprocal ball mount component, which in turn can be coupled to an object, a vehicle, sports equipment, or a user, thereby coupling the camera to the object, vehicle, sports equipment or user. It should be noted that in alternative embodiments, the sliding mount component of FIG. 8c and throughout the application herein can also include a ball mount component, a buckle component, an adhesive component, a magnetic component, or any other suitable component configured to couple to a reciprocal mount component.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skilled in the art will appreciate still additional alternative structural and functional designs for detachable camera mounts as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A camera mount comprising:
   a rail mount component comprising a rail base, a first rail wing, and a second rail wing, the first rail wing and the second rail wing extending horizontally along opposite sides of the rail base, the first rail wing and the second rail wing protruding outward from and towards the rail base such that an angle between the rail base and each of the first rail wing and the second rail wing is less than 90 degrees, wherein the rail base includes one or more tolerance cuts; and
   a sliding mount component configured for insertion into the rail mount component, the sliding mount component comprising a sliding base and a lever pivotally coupled to the sliding base, the lever comprising an associated wedge such that when the lever is in a locked configuration, the associated wedge exerts a force towards the rail base such that a reciprocal force is exerted outward by the rail mount component upon the sliding mount component causing a friction force between the sliding mount component and an inside surface of each of the first rail wing and the second rail wing, securely affixing the sliding mount component to the rail mount component, the sliding mount component further comprising a socket component configured to rotatably couple to a reciprocal ball component, wherein each tolerance cut is configured to flex outward away from the inside surface of the rail base when the lever is configured in the locked configuration.

2. The camera mount of claim 1, wherein the lever is pivotally coupled to the sliding base via a corresponding hinge, the hinge configured to allow the lever to rotate towards or away from the sliding base.

3. The camera mount of claim 1, wherein the lever is in the locked configuration when the lever is rotated away from the sliding base.

4. The camera mount of claim 1, wherein the lever can be configured in an unlocked configured when the lever is rotated towards the sliding base, allowing the sliding mount component to be inserted into or removed from the rail mount component.

5. The camera mount of claim 1, wherein the first rail wing is tapered at a first angle and the second rail wing is tapered at a second angle, wherein the sliding base includes a first sliding edge on a first side of the sliding base and a second sliding edge on a second side of the sliding base opposite the first side, the first sliding edge tapered at substantially the same angle as the first angle and the second sliding edge tapered at substantially the same angle as the second angle.

6. The camera mount of claim 1, wherein the rail base includes a locking hole and wherein the lever includes a pin protruding outward from the lever, the locking hole configured to align with the pin of the lever when the lever is in the locked configuration such that the pin of the lever inserts into the locking hole, further securing the sliding mount component to the rail mount component.

7. The camera mount of claim 1, wherein the rail base includes a stopper component protruding inward from a first end of the rail base such that the stopper component is configured to abut the sliding mount component when the sliding mount component is fully inserted into the rail mount component from a second end of the rail base, preventing the sliding mount component from being inserted beyond the stopper component.

8. The camera mount of claim 1, wherein a first end of the rail mount component includes a dovetail such that the first rail wing and the second rail wing taper towards the first end of the rail mount component.

9. The camera mount of claim 1, wherein the reciprocal ball component is coupled to a camera housing configured to at least partially secure a camera.

10. The cameral mount of claim 5, wherein the reciprocal force exerted outward by the rail mount component upon the sliding mount component causes a friction force between the first sliding edge and the inside surface of the first rail wing and between the second sliding edge and the inside surface of the second rail wing.

11. A camera mount comprising:
    a rail mount component configured to securely couple to an object and comprising one or more tolerance cuts; and
    a sliding mount component configured for insertion into the rail mount component, the sliding mount component comprising a sliding base, a socket component configured to rotatably couple to a reciprocal ball component, and one or more levers pivotally coupled to the sliding base, each lever comprising a wedge such that when the lever is configured in a locked configuration, the wedge exerts a force towards the rail mount component such that a reciprocal force is exerted outward by the rail mount component upon the sliding mount component causing a friction force between the sliding mount component and the rail mount component, securely affixing the sliding mount component to the rail mount component, wherein each tolerance cut is configured to flex outward away from an inside surface of the rail mount component when the lever is configured in the locked configuration.

12. The camera mount of claim 11, wherein each lever is pivotally coupled to the sliding base via a corresponding hinge, the hinge configured to allow the lever to rotate towards or away from the sliding base.

13. The camera mount of claim 11, wherein each lever is in the locked configuration when the lever is rotated away from the sliding base.

14. The camera mount of claim 11, wherein each lever can be configured in an unlocked configured when the lever is rotated towards the sliding base, allowing the sliding mount component to be inserted into or removed from the rail mount component.

15. The cameral mount of claim 11, wherein the reciprocal force is exerted by an inside surface of the rail mount component and an outside surface of the sliding mount component.

16. The camera mount of claim 11, wherein the rail mount component includes a locking hole and wherein a lever includes a pin protruding outward from the lever, the locking hole configured to align with the pin of the lever when the lever is in the locked configuration such that the pin of the lever inserts into the locking hole, further securing the sliding mount component to the rail mount component.

17. The camera mount of claim 11, wherein the rail mount component includes a stopper component protruding inward from a first end of the rail mount component such that the stopper component is configured to abut the sliding mount component when the sliding mount component is fully inserted into the rail mount component from a second end of the rail mount component, preventing the sliding mount component from being inserted beyond the stopper component.

18. The camera mount of claim 11, wherein the reciprocal ball component is coupled to a camera housing configured to at least partially secure a camera.

* * * * *